United States Patent
Murphy et al.

(10) Patent No.: US 10,791,010 B1
(45) Date of Patent: Sep. 29, 2020

(54) SYSTEM AND METHOD FOR LOW PROBABILITY OF DETECTION AND LOW PROBABILITY OF INTERCEPT WAVEFORM

(71) Applicant: Rockwell Collins, Inc., Cedar Rapids, IA (US)

(72) Inventors: Ryan M. Murphy, Marion, IA (US); Carlos J. Chavez, Marion, IA (US); Michael N. Newhouse, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/653,636

(22) Filed: Oct. 15, 2019

(51) Int. Cl.
| | |
|---|---|
| *H04L 25/03* | (2006.01) |
| *H04W 16/14* | (2009.01) |
| *H04B 7/0456* | (2017.01) |
| *G06F 17/14* | (2006.01) |
| *H04L 5/00* | (2006.01) |

(52) U.S. Cl.
CPC ...... *H04L 25/03949* (2013.01); *G06F 17/142* (2013.01); *H04B 7/0456* (2013.01); *H04L 5/0005* (2013.01); *H04L 25/03012* (2013.01); *H04W 16/14* (2013.01)

(58) Field of Classification Search
CPC ............... H04L 25/03885; H04L 27/01; H04L 25/03057
See application file for complete search history.

(56) References Cited

U.S. PATENT DOCUMENTS

| | | |
|---|---|---|
| 7,415,059 B2 | 8/2008 | Chadha et al. |
| 8,509,324 B2 | 8/2013 | Kim et al. |
| 8,929,550 B2 | 1/2015 | Shattil et al. |
| 9,363,123 B2 | 6/2016 | Lo et al. |
| 10,349,332 B2 | 7/2019 | Agee et al. |

(Continued)

FOREIGN PATENT DOCUMENTS

| | | |
|---|---|---|
| EP | 1469649 B1 | 6/2006 |
| EP | 1755214 B1 | 3/2011 |
| WO | 2016163732 A1 | 10/2016 |

*Primary Examiner* — Shuwang Liu
*Assistant Examiner* — Gina M McKie
(74) *Attorney, Agent, or Firm* — Suiter Swantz pc llo

(57) ABSTRACT

In embodiments, a communication node of a multi-node communication network includes a controller communicatively coupled to a communication interface, wherein the controller is configured to: acquire a data payload to be transmitted based on a randomized transmission interval; duplicate a bit sequence of the data payload with a selected spreading pattern; perform bit-to-symbol mapping of the bit sequence based on a selected M-ary number to generate a data payload symbol sequence; randomize a location or value of one or more pilot symbols and one or more data carriers of the data payload symbol sequence; transform frequency-domain symbols of the data payload symbol sequence into time-domain symbols to generate a time-domain data payload signal; remove amplitude fluctuation of the data payload signal to generate a phasor data payload signal; and transmit the phasor data payload signal to at least one additional communication node of the multi-node communication network.

15 Claims, 7 Drawing Sheets

(56) References Cited

U.S. PATENT DOCUMENTS

| | | | |
|---|---|---|---|
| 2003/0081690 A1* | 5/2003 | Kim | H04L 1/0066 |
| | | | 375/264 |
| 2004/0213187 A1* | 10/2004 | Fujil | H04B 7/0408 |
| | | | 370/335 |
| 2005/0180312 A1* | 8/2005 | Walton | H04B 7/0413 |
| | | | 370/208 |
| 2006/0120269 A1* | 6/2006 | Kim | H04L 25/03866 |
| | | | 370/208 |
| 2006/0222013 A1 | 10/2006 | Ban | |
| 2014/0312970 A1* | 10/2014 | Nagasaku | H03F 1/0222 |
| | | | 330/251 |
| 2017/0163406 A1* | 6/2017 | Johnson | H04L 7/0075 |

* cited by examiner

US 10,791,010 B1

SYSTEM AND METHOD FOR LOW PROBABILITY OF DETECTION AND LOW PROBABILITY OF INTERCEPT WAVEFORM

BACKGROUND

Orthogonal frequency-division multiplexing (OFDM) is a signal modulation technique utilized in many communication protocols, including 3G, 4G, 4G LTE, and 5G communications. OFDM techniques have enabled improved spectral efficiency and improved susceptibility to interference and noise. However, signals modulated using traditional OFDM techniques are easily detected/intercepted by threat receivers, and are susceptible to intentional jamming, making traditional OFDM techniques ill-suited in the context of covert communications. Therefore, it would be desirable to provide a system and method which cure one or more of the shortfalls of the previous approaches identified above.

SUMMARY

A communication node of a multi-node communication network is disclosed. In embodiments, the communication node includes a communication interface and a controller communicatively coupled to the communication interface. In embodiments, the controller is configured to: acquire a data payload to be transmitted based on a randomized transmission interval; duplicate a bit sequence of the data payload with a selected spreading pattern; perform bit-to-symbol mapping of the bit sequence based on a selected M-ary number to generate a data payload symbol sequence; randomize at least one of a location or value of one or more pilot symbols and one or more data carriers within one or more subcarriers of the data payload symbol sequence; transform frequency-domain symbols of the data payload symbol sequence into time-domain symbols to generate a time-domain data payload signal; remove amplitude fluctuation of the data payload signal to generate a phasor data payload signal; and transmit the phasor data payload signal, via the communication interface, to at least one additional communication node of the multi-node communication network.

In some embodiments of the communication node, the controller is further configured to filter the phasor data payload signal to a selected peak-to-average-power ratio (PAPr) within a selected spectral mask.

In some embodiments of the communication node, the controller is further configured to encode the bit sequence of the data payload with a forward error-correction code.

In some embodiments of the communication node, a code rate of the forward error-correction code is selected based on at least one of a noise value or interference value determined by the communication node.

In some embodiments of the communication node, the controller is further configured to prepend a preamble to the data payload symbol sequence.

In some embodiments of the communication node, the data payload symbol sequence is devoid of cyclic prefixes.

In some embodiments of the communication node, the controller is further configured to interleave the bit sequence of the data payload with a known interleaving pattern.

In some embodiments of the communication node, performing bit-to-symbol mapping includes transforming each bit of the bit sequence to a constellation point based on the selected M-ary number.

In some embodiments of the communication node, transforming frequency-domain symbols of the data payload symbol sequence into time-domain symbols to generate a time-domain data payload signal includes performing a serial-to-parallel conversion of the data payload symbol sequence in frequency-domain, transforming the data payload symbol sequence in frequency-domain to a data payload symbol sequence in time-domain with an inverse fast Fourier transform (IFFT), and performing a parallel-to-serial conversion of the data payload symbol sequence in time-domain to generate the time-domain data payload signal.

In some embodiments of the communication node, acquiring a data payload to be transmitted includes acquiring a data payload from a data buffer stored in a memory of the communication node.

In some embodiments of the communication node, the controller is further configured to remove amplitude fluctuation of the data payload signal to generate a phasor data payload signal with a selected peak-to-average-power ratio (PAPr).

A communication node of a multi-node communication network is disclosed. In embodiments, the communication node includes a communication interface and a controller communicatively coupled to the communication interface. In embodiments, the controller is configured to: receive a data payload signal from an additional communication node of the multi-node communication network; estimate at least one of a time offset or a frequency offset based on a preamble of the data payload signal; performing one or more coarse timing synchronization processes on the data payload signal; transform the data payload signal from time-domain to frequency domain to generate a frequency-domain data payload symbol sequence; remove a randomization applied to at least one of one or more pilot symbols or one or more user data symbols of the data payload symbol sequence; correct one or more errors of the data payload symbol sequence using known pilot symbols within one or more subcarriers of the data payload symbol sequence; performing one or more dispreading operations based on a selected spreading pattern; demodulate the data payload symbol sequence based on a selected M-ary number to generate a bit sequence of the data payload symbol sequence; and perform one or more decoding operations on the bit sequence of the data payload to determine a data payload associated with the data payload signal.

In some embodiments of the communication node, demodulating the data payload symbol sequence based on the selected M-ary number includes performing one or more soft-decision decoding operations on the data payload symbol sequence to generate a soft-decision symbol vector.

In some embodiments of the communication node, the controller is further configured to convert the soft-decision symbol vector into the bit sequence of the data payload symbol sequence using a selected spreading pattern.

In some embodiments of the communication node, performing one or more coarse timing synchronization processes on the data payload signal includes applying a numerically controlled oscillator (NCO) to the data payload signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
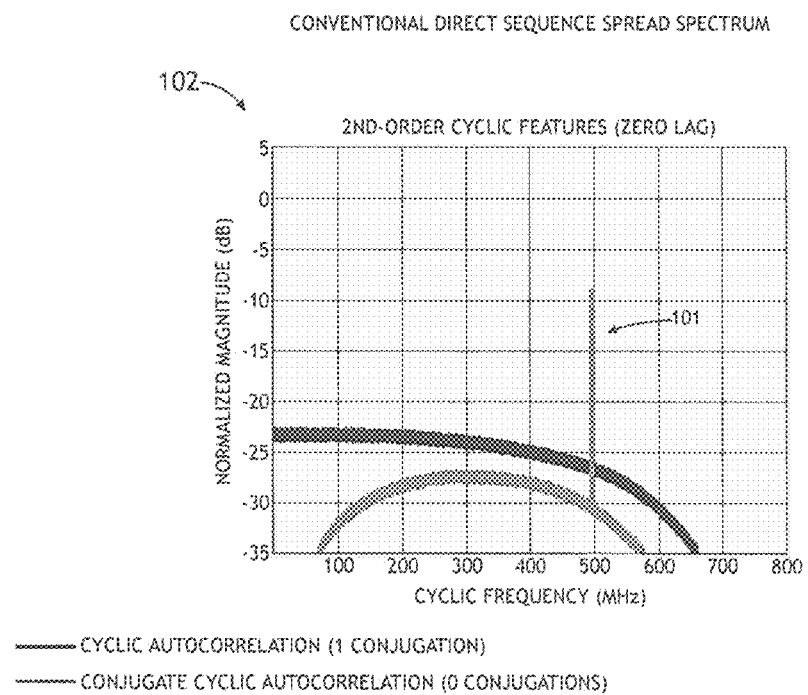
FIG. 1A is a graph illustrating second-order cyclic features resulting from traditional orthogonal frequency-domain multiplexing (OFDM) techniques.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Reference will now be made in detail to the subject matter disclosed, which is illustrated in the accompanying drawings.

Orthogonal frequency-division multiplexing (OFDM) is a signal modulation technique utilized in many communication protocols, including 3G, 4G, 4G LTE, and 5G communications. OFDM techniques have enabled improved spectral efficiency and improved susceptibility to interference and noise. However, signals modulated using traditional OFDM techniques are easily detected/intercepted by threat receivers, and are susceptible to intentional jamming. Therefore, traditional OFDM techniques are ill-suited in the context of covert communications, such as low probability of detection (LPD) and/or low probability of intercept (LPI) communications.

There are several characteristics of traditional OFDM techniques which are not suitable for LPD/LPI communications. First, traditional OFDM techniques utilized in various communication protocols embed cyclo-stationary features within transmitted signals which make it easier for a receiving device to receive, identify, and demodulate the received signals.

For example, traditional OFDM techniques append a cyclic prefix (CP) to the beginning of each symbol interval prior to transmission. Traditional OFDM techniques create the cyclic prefixes by copying a portion (e.g., segment) of each modulated time-domain symbol to be transmitted, and attaching the copied portion to the front of each symbol. The length of the copied portion of each segment (e.g., the length of the cyclic prefixes) may be selected such that it spans the longest expected delay-spread of the channel. Thus, cyclic prefixes are used as guard intervals to prevent inter-symbol interference, and to mitigate the effects of multipath propagation. In particular, cyclic prefixes allow for a demodulator of a receiver to take advantage of the cyclic properties of a fast Fourier transform (FFT) used during modulation/demodulation, thereby facilitating the ability of the receiver to compensate for timing, phase, frequency, and gain using a 1-tap frequency-domain equalizer per subcarrier.

While the cyclic prefixes used in traditional OFDM techniques facilitate efficient waveform identification and demodulation, these features pose drawbacks in the context of LPD/LPI communications. For example, the repetition of a sequence of samples formed by the cyclic prefixes create an auto-correlation feature, which threat receivers (e.g., enemy receivers) may utilize to identify and detect the OFDM-modulated signals in low signal-to-noise (SNR) conditions. Thus, the use of cyclic prefixes in traditional OFDM techniques is not conducive for LPD/LPI communications where signals are must remain undetectable by threat receivers.

Another cyclo-stationary feature utilized in traditional OFDM techniques are static pilot tones (pilot symbols) present within the symbol interval. Similar to cyclic prefixes, pilot tones/symbols facilitate the correction of fine time, phase, frequency, and gain errors missed during waveform acquisition within a receiver. Static pilot tones may create second-order cyclic features within transmitted signals. These second-order cyclic features may be further understood with reference to FIGS. 1A and 1B.

Figure 1B:
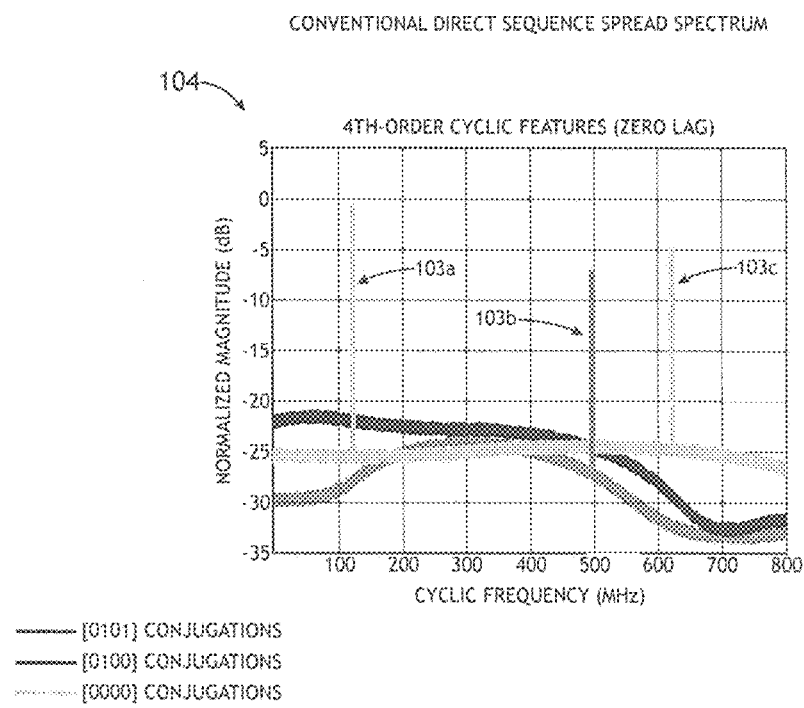
FIG. 1B is a graph illustrating fourth-order cyclic features resulting from traditional orthogonal frequency-domain multiplexing (OFDM) techniques.

FIG. 1A is a graph 102 illustrating second-order cyclic features 101 resulting from traditional OFDM techniques. FIG. 1B is a graph 104 illustrating fourth-order cyclic features 103a, 103b, 103c resulting from traditional OFDM techniques. Graphs 102 and 104 illustrate normalized magnitude of a signal received by a detector (e.g., receiver) plotted against cyclic frequencies of the received signals.

As may be seen in FIG. 1A, static pilot tones/symbols may create second-order cyclic features 101 (e.g., chip rate features) in the transmitted signals. Similarly, as may be seen in FIG. 1B, traditional OFDM techniques may also create fourth-order cyclic features 103a, 103b, 103c (e.g., chip rate features, carrier frequency features, symbol rate features) in the transmitted signals. By correlating received signals and executing algorithms configured to perform cyclic feature detection, threat receivers/detectors may be configured to identify the cyclic features 101, 103a-103c, and thereby detect the transmitted signals.

Another issue associated with the use of traditional OFDM techniques in the context of LPD/LPI communications is the large fluctuations in power resulting from the OFDM techniques. Large fluctuations in power resulting from traditional OFDM techniques creates undesirable peak-to-average-power ratios (PAPr). PAPr occurs when phasors from various carriers of a signal constructively add to drive large fluctuations in the peak power of the modulated waveform. These large peak power fluctuations require a large linear operating range, resulting in increased complexity and cost of power amplifiers within transmitting devices. Additionally, these large peak power fluctuations result in power amplifiers requiring a back-off in the modulated average power of the waveform in order to allow the peak power to spike without power amplifier saturation. Reducing the power of the power amplifiers in order to account for large PAPr values then effectively reduces the transmittal range of the OFDM modulated signals.

Accordingly, embodiments of the present disclosure are directed to a system and method which cure one or more of the shortfalls of previous approaches identified above. Embodiments of the present disclosure are directed to a multi-node communication network configured to transmit and receive data payloads using featureless Gaussian noise waveforms (GNW). Additional embodiments of the present disclosure are directed to communication nodes configured to utilize modified OFDM techniques in order to suppress/remove cyclic prefixes, randomize sub-carriers and pilot symbol values, and correct for distortions utilizing direct sequence spreading of the data carriers. Further embodiments of the present disclosure are directed to a communication node configured to eliminate all statistical and cyclic features from a transmitted waveform such that the waveform may be used to transmit data payloads in the context of LPD/LPI communications.

It is contemplated herein that embodiments of the present disclosure may result in transmitted waveforms which mimic the statistics of Gaussian noise, and thereby force threat receivers to detect the transmitted signals based on energy alone (e.g., via a radiometer). Detection and/or jamming may be further mitigated using a wide range of techniques, including short message durations, randomized message timing, wide frequency spreading, and directionality.

Figure 2:
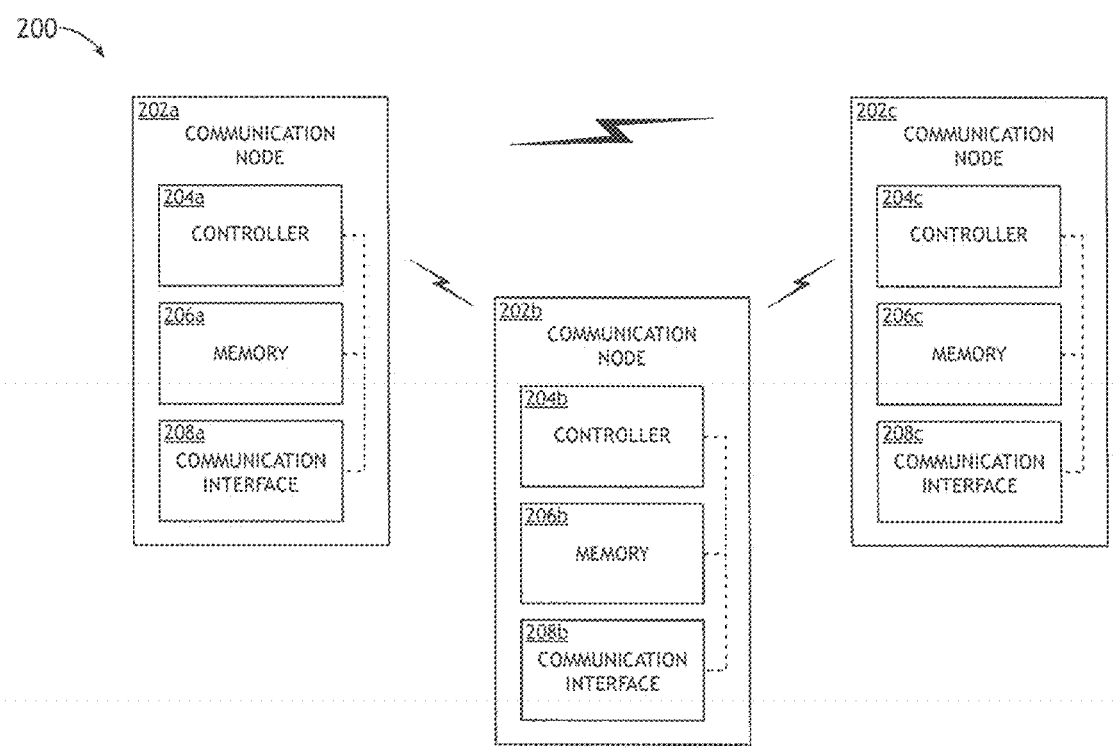
FIG. 2 illustrates a multi-node communication network, in accordance with one or more embodiments of the present disclosure.

FIG. 2 illustrates a multi-node communication network 200, in accordance with one or more embodiments of the present disclosure. In embodiments, the multi-node communication network 200 may include a plurality of communication nodes 202. For example, the multi-node communication network 200 may include a first communication node 202a, a second communication node 202b, and a third communication node 202c.

The multi-node communication network 200 may include any multi-node communication network known in the art. For example, the multi-node communication network 200 may include a mobile ad-hoc network (MANET) in which each communication node 202 within the multi-node communication network is able to move freely and independently. Similarly, the one or more communication nodes 202 may include any communication node known in the art which may be communicatively coupled. In this regard, the one or more communication nodes 202 may include any communication node known in the art for transmitting/transceiving data packets. For example, the one or more communication nodes 202 may include, but are not limited to, radios, mobile phones, smart phones, tablets, smart watches, laptops, vehicle communication devices (e.g., aircraft communication devices), and the like.

Each communication node 202 of the one or more communication nodes 202a, 202b, 202c may include, but is not limited to, a respective controller 204 (e.g., controller 204a, 204b, 204c, etc.), memory 206 (e.g., memory 206a, 206b, 206c, etc.), and communication interface 208 (e.g., communication interface 208a, 208b, 208c, etc.).

The controller 204 provides processing functionality for at least the communication node 202 and can include any number of processors, micro-controllers, circuitry, field programmable gate array (FPGA) or other processing systems, and resident or external memory for storing data, executable code, and other information accessed or generated by the communication node 202. The controller 204 can execute one or more software programs embodied in a non-transitory computer readable medium (e.g., memory 206) that implement techniques described herein. The controller 204 is not limited by the materials from which it is formed or the processing mechanisms employed therein and, as such, can be implemented via semiconductor(s) and/or transistors (e.g., using electronic integrated circuit (IC) components), and so forth.

The memory 206 can be an example of tangible, computer-readable storage medium that provides storage functionality to store various data and/or program code associated with operation of the communication node 202/controller 204, such as software programs and/or code segments, or other data to instruct the controller 204, and possibly other components of the communication node 202, to perform the functionality described herein. Thus, the memory 206 can store data, such as a program of instructions for operating the communication node 202, including its components (e.g., controller 204, communication interface 208, etc.), and so forth. It should be noted that while a single memory 206 is described, a wide variety of types and combinations of memory (e.g., tangible, non-transitory memory) can be employed. The memory 206 can be integral with the controller 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 208 can be operatively configured to communicate with components of the communication node 202. For example, the communication interface 208 can be configured to retrieve data from the controller 204 or other devices (e.g., other communication nodes 202), transmit data for storage in the memory 206, retrieve data from storage in the memory 206, and so forth. The communication interface 208 can also be communicatively coupled with the controller 204 to facilitate data transfer between components of the communication node 202 and the controller 204. It should be noted that while the communication interface 208 is described as a component of the communication node 202, one or more components of the communication interface 208 can be implemented as external components communicatively coupled to the communication node 202 via a wired and/or wireless connection. The communication node 202 can also include and/or connect to one or more input/output (I/O) devices. In embodiments, the communication interface 208 includes or is coupled to a transmitter, receiver, transceiver, physical connection interface, or any combination thereof.

It is contemplated herein that the communication interface 208 of a communication node 202 may be configured to communicatively couple to additional communication interfaces 208 of additional communication nodes 202 of the multi-node communication network 200 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

In embodiments, the controller 204 of a communication node 202 is configured to carry out various steps and functions of the present disclosure. The controller 204 may be configured to: acquire a data payload to be transmitted based on a randomized and/or sparse transmission interval; duplicate a bit sequence of the data payload with a selected spreading pattern; perform bit-to-symbol mapping of the bit sequence based on a selected M-ary number to generate a data payload symbol sequence; randomize at least one of a location or value of one or more pilot symbols and one or more data carriers within one or more subcarriers of the data payload symbol sequence; transform frequency-domain symbols of the data payload symbol sequence into time-domain symbols to generate a time-domain data payload signal; remove amplitude fluctuation of the data payload signal to generate a phasor data payload signal; and transmit the phasor data payload signal, via the communication interface 208, to at least one additional communication node 202 of the multi-node communication network 200.

Figure 3:
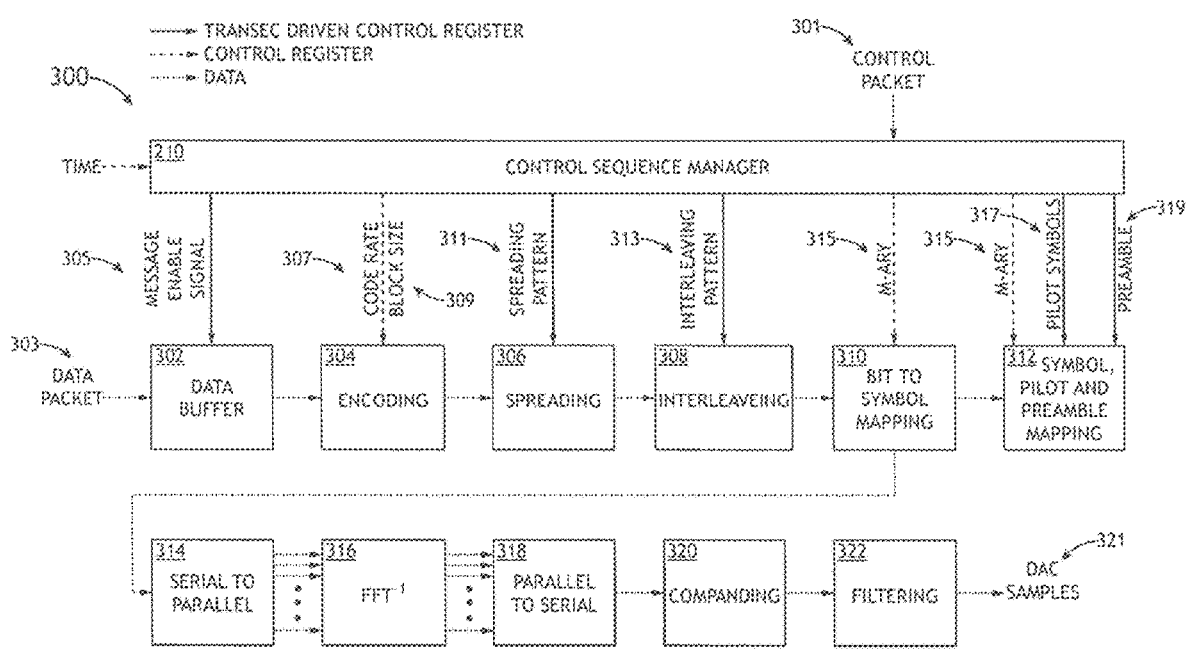
FIG. 3 illustrates a flowchart of a method for transmitting data payloads via a featureless Gaussian noise waveform (GNW), in accordance with one or more embodiments of the present disclosure.

Each of these steps carried out by the controller 204 of a communication node 202 of the multi-node communication network 200 may be further shown and understood with reference to FIG. 3.

FIG. 3 illustrates a flowchart of a method 300 for transmitting data payloads via a featureless Gaussian noise waveform (GNW), in accordance with one or more embodiments of the present disclosure. It is noted herein that the steps of method 300 may be implemented all or in part by multi-node communication network 200. It is further recognized, however, that the method 300 is not limited to the multi-node communication network 200 in that additional or alternative system-level embodiments may carry out all or part of the steps of method 300.

Various steps/functions of method 300 are shown and described as being carried out by a control sequence manager 210 (CSM 210). In embodiments, the CSM 210 may include a module of the controller 204 of a communication node 202. In additional and/or alternative embodiments, the CSM 210 may include a software program (e.g., set of program instructions) stored in memory 206 which are executable by the controller 204. In embodiments, the CSM 210 (e.g., controller 204) may be configured to direct the flow of user data traffic within a multi-node communication network 200. The CSM 210 (e.g., controller 204) may be configured to command changes to registers at specific transmission security (TRANSEC) driven time epochs in order to enable LPD and/or LPI communications. Register values and register switch-over time may be part of a control packet 301 received from the Gaussian noise waveform (GNW) link layer and MAC layer. The GNW link layer may be responsible for controlling the flow of data between two communication nodes 202 of the multi-node communication network, wherein the MAC layer may be responsible for transmitting/receiving control messages which establish and maintain network connectivity within the multi-node communication network.

It is further noted herein that the physical layer of the communication node 202/CSM 210 may not be limited to any particular messaging and/or communication protocol method. In this regard, embodiments of the present disclosure may be configured to support any existing and/or future communication/messaging protocols.

In a step 302, a data payload 303 (e.g., data packet 303) to be transmitted is acquired. For example, data payloads 303 (e.g., data packets 303) of user data to be transmitted throughout the multi-node communication network 200 may be received from the GNW link and MAC layer. The data payloads 303 may be stored in a data buffer stored in memory 206. Data payloads 303 may be stored in the data buffer until the CSM 210 transmits one or more message enable signals 305, which allows the selected data payload 303 to flow through the subsequent processing blocks of method 300 in order to be transmitted. based on a randomized transmission sequence.

Data payloads 303 may be stored in the data buffer and/or selected by the CSM 210 for transmission using any technique known in the art. For example, data payloads 303 may be stored in the data buffer (e.g., data buffer within memory 206) in chronological order corresponding with a chronological order of receipt. By way of another example, the CSM 210 may acquire a data packet 303 according to a priority label/hierarchy associated with stored data packets 303. By way of another example, the CSM 210 may select data packets 303 for transmission in step 302 in chronological order, such that older data packets 303 stored in the data buffer are selected/transmitted first.

In embodiments, the CSM 210 may acquire/select data payloads 303 to be transmitted based on a randomized and/or sparse transmission interval, such that the communication node 202 exhibits sparse, randomized transmissions. For example, the CSM 210 (e.g., controller 204) may be configured to transmit message enable signals 305 at random intervals (e.g., randomized transmission intervals) such that the controller 204 acquires/transmits data payloads in a random manner. It is noted herein that controlling the flow of traffic via message enable signals 305 at randomized transmission intervals may allow the communication node 202 to maintain sparse and randomized transmissions, thereby mitigating spectral lines at specified/regular transmission rates. In this regard, randomized transmission intervals utilized in step 302 and throughout the present disclosure may remove/mitigate message rate features within transmitted signals, thereby mitigating the efficiency of potential threat receivers in detecting the signals.

In a step 304, one or more encoding operations are performed on a bit sequence of the data payload 303. It is noted herein that any encoding operations known in the art may be utilized in step 304 including, but not limited to, forward error correction operations, block code operations, convolutional code operations, and the like. It is further noted herein that any type of encoder known in the art may be used. For example, in some embodiments, a 3rd Generation Partnership Project (3GPP) Turbo Encoder may be used. In this regard, the communication node 202 and/or controller 204 may include a 3GPP Turbo Encoder, or may be configured to perform one or more encoding operations of a 3GPP Turbo Encoder.

In embodiments, the CSM 210 (controller 204) may be configured to encode a bit sequence of the data payload 303 with a forward error-correction code utilizing a selected code rate 307 and a selected block size 309 received by the CSM 210. The selected code rate 307 may be selected in order to determine the proportion of data within a transmitted signal which is non-redundant. In this regard, it is contemplated herein that the code rate 307 and/or block size 309 of the forward error correction code may be adaptable in real-time based on over-the-air channel conditions experienced and/or identified by the communication node 202. For example, the controller 204 of the communication node 202 may be configured to identify one or more characteristics/conditions of a communication channel (e.g., current communication channel) used by the multi-node communication network 200 and/or communication node 202. The one or more characteristics/conditions may include, but are not limited to, channel noise, channel interference (e.g., interference from other users, interference from jammers), and the like. In this example, the controller 204 may be configured to selectively adjust the code rate 307 and/or block size 309 based on the one or more determined characteristics. By way of another example, the controller 204 may be configured to select and/or selectively adjust the code rate 307 and/or block size 309 in order to maintain a bit error rate (BER) of transmitted data/signals which is greater than a selected BER threshold value.

In a step 306, a bit sequence of the data payload is duplicated with a selected spreading pattern 311. In embodiments, the controller 204 may be configured to duplicate the bit sequence of the data payload via one or more spread-spectrum modulation operations (e.g., direct-sequence spreading operations). For example, the controller 204 may be configured to expand an encoded bit of the bit sequence of the data payload into multiple bits according to the selected spreading pattern (e.g., spreading ratio, spreading spectrum, and the like). It is contemplated herein that performing one or more spread-spectrum modulation operations on data payloads to be transmitted may introduce data subcarrier redundancy, which may improve the overall efficiency of the multi-node communication network 200. In particular, the utilization of a large number of subcarriers may allow embodiments of the present disclosure to compensate for any losses in BER attributable to various steps/functions of the present disclosure.

Furthermore, the use of a large number of subcarriers to transmit each individual data payload may generate a transmitted sequence/waveform which resembles/simulates a Gaussian noise waveform, as explained by the central limit theorem. Additionally, the interaction of phasors among the plurality of subcarriers may generate self-induced intermodulation noise, further masking spectral lines and cyclo-stationary features. Taken together, these effects mitigate the efficiency of threat receivers and jammers by simulating a GNW and reducing and/or eliminating the presence of spectral lines and cyclo-stationary features.

In a step 308, the bit sequence of the data payload is interleaved with a selected spreading pattern 313. In embodiments, the controller 204 may perform one or more interleaving operations on the bit sequence based on the selected spreading pattern 313 to scramble data across multiple GNW symbol times. Interleaving operations configured to scramble data across multiple symbol times may be performed to mitigate the effects of jamming and/or fading.

In a step 310, bit-to-symbol mapping operations are performed on the bit sequence based on a selected M-ary number 315 to generate a data payload symbol sequence. In embodiments, one or more bit-to-symbol mapping operations may be performed in order to transform a bit of the bit sequence into a constellation point, based on the selected M-ary number 315. In this regard, each bit of the bit sequence may be mapped to a particular state of a subcarrier waveform. The number of bits of the bit sequence mapped (e.g., encoded) into each symbol of the data payload symbol sequence may be dependent, at least in part, on the selected M-ary number 315. The selected M-ary number may define the order of digital modulation, wherein an M-ary number of two refers to binary phase-shift keying (BPSK), an M-ary number of 4 refers to quadrature phase shift keying (QPSK), and the like. In this regard, the controller 204 may be configured to selectively adjust the selected M-ary number 315 according to one or more characteristics including, but not limited to, the modulation technique to be utilized, amount of data to be transmitted (e.g., number of data payloads 303 in the data buffer), channel noise, channel interference, and the like. Additionally, the controller 204 may be configured to perform bit-to-symbol mapping operations using any M-ary number 315 known in the art.

In a step 312, a preamble and pilot tones are added to the data payload symbol sequence. In embodiments, the controller 204 may be configured to add pilot symbols 317 to randomized carriers. For example, in step 312, the controller 204 may be configured to randomize at least one of a location or value of one or more pilot symbols 317 and one or more data carriers within one or more subcarriers of the data payload symbol sequence.

Figure 4A:
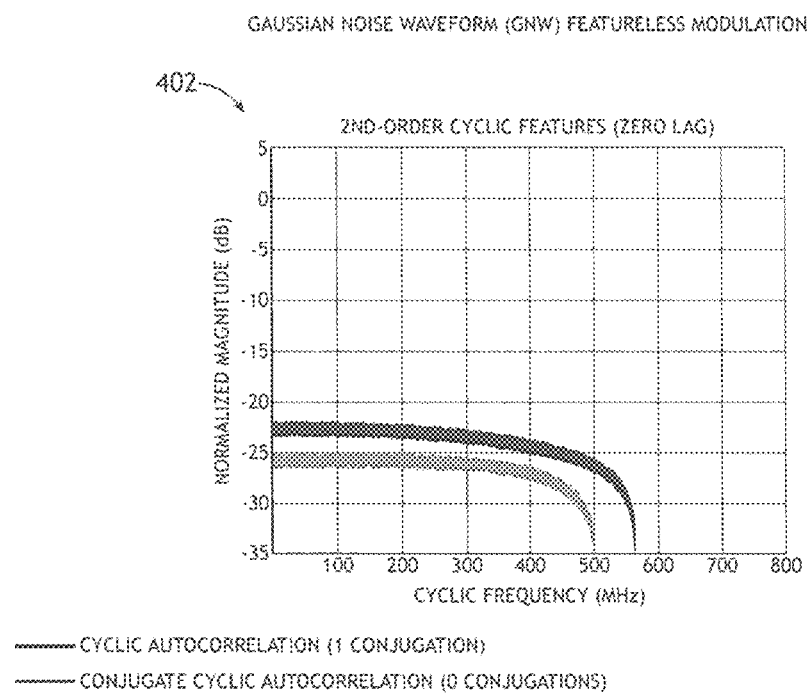
FIG. 4A is a graph illustrating the absence of second-order cyclic features within a featureless Gaussian noise waveform (GNW), in accordance with one or more embodiments of the present disclosure.
Figure 4B:
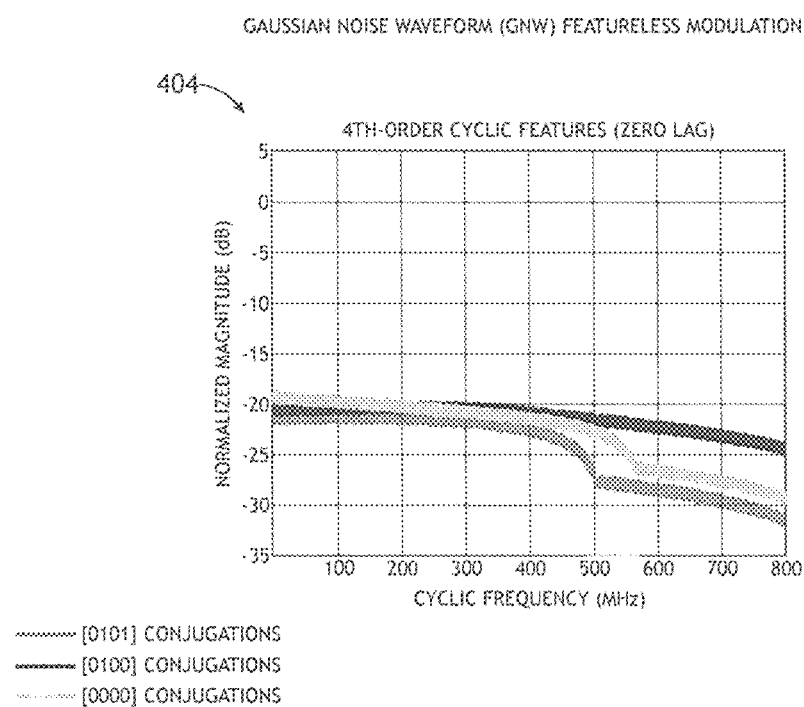
FIG. 4B is a graph illustrating the absence of fourth-order cyclic features within a featureless Gaussian noise waveform (GNW), in accordance with one or more embodiments of the present disclosure.

As noted previously herein, one drawback of traditional OFDM techniques is the presence of static pilot tones/symbols within the symbol intervals. These static pilot symbols may result in second-order cyclo-stationary features, which may be readily identified and detected by threat receivers. Comparatively, by adding pilot symbols 317 with randomized locations and/or values within randomized subcarriers of the data payload symbol sequence, embodiments of the present disclosure may reduce and/or eliminate the presence of cyclo-stationary features which may be used by threat receivers, such as second-order cyclic features. This may be further understood with reference to FIGS. 4A-4B FIG. 4A is a graph 402 illustrating the absence of second-order cyclic features within a featureless Gaussian noise waveform (GNW), in accordance with one or more embodiments of the present disclosure. FIG. 4B is a graph illustrating the absence of fourth-order cyclic features within a featureless Gaussian noise waveform (GNW), in accordance with one or more embodiments of the present disclosure.

By comparing graphs 402 and 404 to graphs 102 and 104, it may be seen that embodiments of the present disclosure may facilitate the reduction and/or removal of cyclo-stationary features within a transmitted waveform. For example, as shown in FIG. 4A, the randomization of pilot symbols 317 in step 312, in conjunction with additional embodiments of the present disclosure, may eliminate the presence of second-order cyclic features.

Reference will again be made to FIG. 3. In embodiments, the controller 204 may additionally be configured to prepend a preamble 319 to the data payload symbol sequence. For example, the controller 204 may be configured to prepend a preamble 319 to the front of the GNW frame (e.g., data payload symbol sequence). In embodiments, the preamble 319 prepended to the data payload symbol sequence may be utilized by a receiving communication node 202 to facilitate accurate time, phase, and frequency estimates to synchronize the over-the-air burst.

Embodiments of the present disclosure may eschew the addition of cyclic prefixes to each symbol of the data payload symbol sequence. Accordingly, the data payload symbol sequence may be devoid of any cyclic prefixes. In this regard, the preamble 319 added in step 312 may perform the functions typically performed by cyclic prefixes used in traditional OFDM techniques, such as facilitating accurate time, phase, and frequency estimates.

It is noted herein that the removal of cyclic prefixes and the randomization of pilot symbols within the multi-node communication network 100 may induce several negative consequences. For example, the removal of cyclic prefixes and the randomization of pilot symbols may increase the BER of the multi-node communication network 100. By way of another example, the removal of cyclic prefixes and the randomization of pilot symbols may increase errors in time, phase, and frequency estimates within the multi-node communication network 100, which may manifest as inter-carrier interference (ICI). Without cyclic prefixes in transmitted signals, these estimation errors and ICI can not be completely eliminated. Direct-sequence spreading (step 306) and forward error correction (step 304) are two techniques of the present disclosure used to address these consequences. It is contemplated herein that introduction of carrier redundancy via direct-sequence spreading (step 306) may correct for bit errors and any loss in performance attributable to ICI as a result of the removal of cyclic prefixes and randomization of pilot symbols.

In a step 314, a serial-to-parallel conversion of the data payload symbol sequence is performed. In a step 316, an inverse fast Fourier transform (e.g., IFFT or $FFT^{-1}$) is performed in order to transform frequency-domain symbols of the data payload symbol sequence into time-domain symbols (e.g., transform frequency-domain symbol sequence into a Gaussian time-domain sequence). For example, the controller 204 may be configured to apply an IFFT to the data payload symbol sequence in frequency-domain in order to generate a data payload symbol sequence in time-domain. Subsequently, in a step 318, the a parallel-to-serial conversion of the time-domain data payload symbol sequence may be performed in order to generate a time-domain data payload signal.

In a step 320, amplitude fluctuation(s) of the data payload signal are removed to generate a phasor data payload signal. For example, the controller 204 may be configured to receive the data payload signal generated from steps 314-318, and remove the amplitudes of the data payload signal in order to generate a phasor data payload signal which includes only phasor fluctuations and no amplitude fluctuations. Conceptually, the controller 204 may be configured to remove amplitude fluctuation in order to drive the data payload signal to the unit circle. In other words, the controller 204 may be configure to drive modulated IQ samples of the data payload signal to the unit circle by knocking down signal peaks.

As noted previously herein, one drawback of traditional OFDM techniques is large power fluctuations resulting in large peak-to-average-power ratios (PAPr) which places operational burdens on power amplifiers. This issue may be addressed by embodiments of the present disclosure. For example, by removing amplitude fluctuations and knocking down signal peaks of the data payload signal in step 320, the controller 204 may effectively reduce the peak-to-average-power ratio (PAPr) of the data payload signal. For instance, the controller 204 may be configured to reduce and/or remove amplitude fluctuations of the data payload signal in order to generate a phasor data payload signal with a selected PAPr.

By reducing the PAPr to a desirable value, embodiments of the present disclosure may avoid the need for power amplifier back-off, which is typically required for traditional OFDM techniques. Furthermore, by preventing the need for power amplifier back-off, the effective range of data transmissions between communication nodes 202 of the multi-node communication network 200 may effectively be increased. For example, after removing amplitude fluctuations and reducing PAPr, the controller 204 may be configured to increase an average signal power of the phasor data payload signal, thereby improving a range of the phasor data payload signal.

It is noted herein that reducing and/or removing amplitude fluctuations in the data payload signal may effectively increase the bandwidth spanned by the phasor data payload signal. In this regard, a waveform of the phasor data payload signal may consume more bandwidth as compared to a waveform of the data payload signal prior to the removal of amplitude fluctuation. Additionally, oversampling a transmitted signal runs the risk of adding cyclo-stationary features back into the transmitted signal.

Accordingly, in a step 322, the phasor data payload signal may be filtered. For example, the controller 204 may be configured to perform one or more signal filtering operations in order to filter the phasor data payload signal and control spectral regrowth. The controller 204 may utilize any type of filter known in the art including, but not limited to, bandpass filters. For instance, 204, the controller 204 may perform one or more or more signal filtering operations in order to filter the phasor data payload signal to a selected bandwidth and/or a selected PAPr within a selected spectral mask. In filtering the phasor data payload signal, the controller 204 may be configured to control spectral regrowth, reduce the amount of consumed bandwidth, and reduce and/or remove features from the phasor data payload signal attributable to oversampling.

In embodiments, the controller 204 may be configured to transmit the phasor data payload signal, via the communication interface, to at least one additional communication node 202 of the multi-node communication network 200. For example, as shown in FIG. 3, the controller 204 may be configured to transmit the phasor data payload signal (e.g., DAC samples 321) to one or more additional communication nodes 202. As noted previously herein, the phasor data payload signal (e.g., DAC samples 321) may mimic a Gaussian noise waveform (GNW).

It is contemplated herein that transmitting signals which mimic a GNW may enable embodiments of the present disclosure to transmit data payloads in the context of LPD/LPI communications. In particular, embodiments of the present disclosure may mitigate the effectiveness of various threat detectors and/or jammers. Mitigation techniques utilized by the present disclosure to combat various types of detectors and jammers are summarized in Table 1 and Table 2 below:

TABLE 1

Mitigation of Various Interceptor/Detector Types

| Detector Type | Mitigation Techniques |
| --- | --- |
| Radiometric detector | Spread-spectrum modulation, robust forward error correction, randomization of message timing |
| Feature detector | Spread-spectrum modulation, robust forward error correction, randomization of message timing; elimination/suppression of cyclic and/or statistical features |
| Spatial detector | Spread-spectrum modulation, robust forward error correction, randomization of message timing; elimination/suppression of cyclic and/or statistical features |

TABLE 2

Resilience to Various Jammer Types

| Jammer Type | Mitigation Techniques |
| --- | --- |
| Full-band | Spread-spectrum modulation, robust forward error correction |
| Full-time | Spread-spectrum modulation, robust forward error correction |
| Noise | Spread-spectrum modulation, robust forward error correction |
| Partial-band | Spread-spectrum modulation, robust forward error correction, distributed reference sequences, adaptive frequency-domain processing |
| Partial-time (pulse) | Spread-spectrum modulation, robust forward error correction, distributed reference sequences, adaptive time-domain processing, randomization of message timing |
| Tone | Spread-spectrum modulation, robust forward error correction, adaptive narrowband excision |
| Modulation-matched | Spread-spectrum modulation, robust forward error correction, noise-like modulation |
| Repeat | Spread-spectrum modulation, robust forward error correction, no repeating signal structure, randomization of message timing |
| Follower | Spread-spectrum modulation, robust forward error correction |

Figure 5:
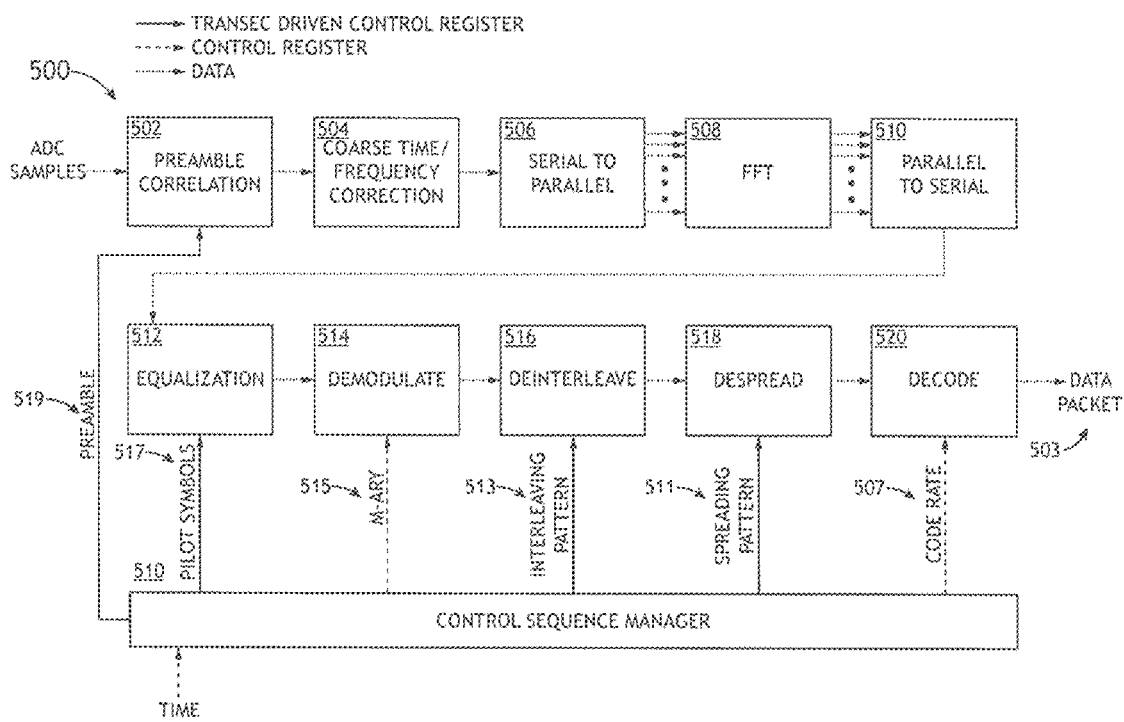
FIG. 5 illustrates a flowchart of a method for receiving data payloads via a featureless Gaussian noise waveform (GNW), in accordance with one or more embodiments of the present disclosure.

FIG. 5 illustrates a flowchart of a method 500 for receiving data payloads via a featureless Gaussian noise waveform (GNW), in accordance with one or more embodiments of the present disclosure. It is noted herein that the steps of method 500 may be implemented all or in part by multi-node communication network 200. It is further recognized, however, that the method 500 is not limited to the multi-node communication network 200 in that additional or alternative system-level embodiments may carry out all or part of the steps of method 500.

It is noted herein that method 500 may illustrate steps/functions carried out by a communication node 202 of the multi-node communication network 200 when receiving a phasor data payload signal transmitted by another communication node 202, as described in FIG. 3. For example, in some embodiments, the method 500 may describe steps/functions carried out in receiving, synchronizing, demodulating, and decoding the data packet 303 (e.g., GNW user data packet 303) transmitted in method 300. By way of another example, the method 500 may illustrate steps/functions carried out by the same communication node 202 shown and described as carrying out the transmission method 300.

It is further noted herein that the physical layer of the communication node 202/CSM 510 may not be limited to any particular messaging and/or communication protocol method. In this regard, embodiments of the present disclosure may be configured to support any existing and/or future communication/messaging protocols.

In embodiments, the CSM 510 may include a module of the controller 204 of a communication node 202. In additional and/or alternative embodiments, the CSM 510 may include a software program (e.g., set of program instructions) stored in memory 206 and executable by the controller 204. In embodiments, the CSM 510 (e.g., controller 204) may be configured to direct the flow of user data traffic within a multi-node communication network 200. The CSM 510 (e.g., controller 204) may be configured to command changes to registers at specific transmission security (TRANSEC) driven time epochs in order to enable LPD and/or LPI communications. As noted previously herein with respect to FIG. 3, the CSM 510 illustrated in FIG. 5 may be configured to control the flow of samples/signals within the multi-node communication network 200.

In a step 502, a data payload is received, and preamble correlation is performed. For example, in some embodiments, the controller 204 may receive a phasor data payload signal, via a communication interface 208, transmitted by another communication node 202 of the multi-node communication network 200. The controller 204 may then be configured to synchronize the over-the-air GNW frame of the phasor data payload signal and estimate at least one of a time offset or a frequency offset based on a selected preamble 519. For example, upon receiving the phasor data payload signal shown and described in FIG. 3, the controller 204 may be configured to utilize the preamble 319 prepended in step 312 in order to perform preamble correlation in step 502. In this example, the selected preamble 519 used in data payload reception (e.g., method 500) may be the same as preamble 319 used during data payload transmission (e.g., method 300).

In a step 504, coarse time and frequency correction is performed. For example, the controller 204 may be configured to perform one or more coarse timing synchronization processes on the received data payload signal. In embodiments, the controller 204 may be configured to align the received data payload signal to the GNW symbol boundary. In another embodiment, the controller 204 may be configured to utilize/apply a numerically controlled oscillator (NCO) in order to reduce and/or remove the effects of Doppler on the received data payload signal.

In a step 506, a serial-to-parallel conversion of the received data payload signal is performed. In a step 508, a fast Fourier transform (e.g., FFT) is performed in order to transform the received data payload signal from the time-domain to the frequency-domain (e.g., transform GNW time-domain data payload signal to frequency-domain data payload signal). For example, the controller 204 may be configured to perform an FFT in order to transform the data payload signal from a time domain to a frequency domain in order to generate a frequency-domain data payload symbol sequence. Subsequently, in a step 510, a parallel-to-serial conversion of the frequency-domain data payload symbol sequence may be performed in order to generate a frequency-domain data payload symbol sequence.

In a step 512, at least one of an adaptive frequency process or an adaptive time-domain process is performed. For example, the controller 204 may be configured to correct for fine timing, phase, and frequency errors not accounted for during acquisition based on one or more selected pilot symbols 517. For instance, upon receiving the phasor data payload signal shown and described in FIG. 3, the controller 204 may be configured to utilize the randomized pilot symbols 317 added in step 312 in order to perform the one or more adaptive frequency processes and/or adaptive time-domain processes in step 512. In this example, the selected pilot symbols 517 used in data payload reception (e.g., method 500) may be the same as selected pilot symbols 317 used during data payload transmission (e.g., method 300). In this regard, the controller 204 may be configured to correct one or more errors of the data payload symbol sequence using known pilot symbols 317, 517 of the data payload symbol sequence. It is noted herein that adaptive frequency processes and/or adaptive time-domain processes may be performed in order to mitigate the effects of jamming.

In additional embodiments, the controller 204 may be further configured to remove randomization applied to one or more pilot symbols and/or one or more user data symbols of the data payload symbol sequence. For example, as noted previously herein, a controller 204 of a transmitting communication node 202 may be configured to randomize at least one of a location or value of one or more pilot symbols 317 and one or more data carriers within one or more subcarriers of the data payload symbol sequence. In this regard, the controller 204 of a receiving communication node 202 may be configured to remove randomization of pilot tones and/or data carriers implemented by the transmitting communication node 202. The controller 204 may be configured to remove randomization based on the one or more known/selected pilot symbols 317, 517.

In a step 514, the data payload symbol sequence is demodulated. In embodiments, the controller 204 may be configured to demodulate the data payload symbol sequence based on a selected M-ary number 515. For example, the controller 204 may be configured to demodulate the data payload symbol sequence based on the selected M-ary number 515 in order to generate a bit sequence of the data payload symbol sequence. By way of another example, the demodulating the data payload symbol sequence may include performing one or more soft-decision decoding operations on the data payload symbol sequence (e.g., IQ sample), based on the selected M-ary number 515, in order to generate a soft-decision symbol vector. For instance, when receiving the phasor data payload signal shown and described in FIG. 3, the controller 204 may be configured to utilize the selected M-ary number 315 utilized in steps 310-312 in order to perform the one or more demodulation operations in step 514. In this example, the selected M-ary number 515 used in data payload reception (e.g., method 500) may be the same as selected M-ary number 315 used during data payload transmission (e.g., method 300).

In a step 516, one or more descrambling and/or deinterleaving operations may be performed. For example, the controller 204 may be configured to perform one or more deinterleaving operations on a bit sequence of the data payload based on a selected interleaving pattern 513. For instance, when receiving the phasor data payload signal shown and described in FIG. 3, the controller 204 may be configured to utilize the selected interleaving pattern 313 utilized in step 308 in order to perform the one or more deinterleaving operations in step 516. In this example, the selected interleaving pattern 513 used in data payload reception (e.g., method 500) may be the same as selected interleaving pattern 313 used during data payload transmission (e.g., method 300).

In a step 518, one or more dispreading operations are performed. The one or more dispreading operations may be performed on the user data carriers based on a known spreading pattern 511. For example, the controller 204 may be configured to convert the soft-decision symbol vector into a bit sequence of the data payload symbol sequence using a selected spreading pattern 511. For instance, when receiving the phasor data payload signal shown and described in FIG. 3, the controller 204 may be configured to utilize the selected spreading pattern 311 utilized in step 306 in order to perform the one or more dispreading operations in step 518 on the data carriers. In this example, the selected spreading pattern 511 used in data payload reception (e.g., method 500) may be the same as selected spreading pattern 311 used during data payload transmission (e.g., method 300).

In a step 520, one or more decoding operations are performed. For example, in embodiments, the controller 204 may be configured to perform one or more decoding operations on the bit sequence of the data payload based on a selected code rate 507. In performing one or more decoding operations on the bit sequence of the data payload, the controller 204 may be configured to determine/extract the data payload (e.g., data packet 503) associated with the data payload signal received by the communication node 202. For example, the controller 204 may be configured to perform one or more turbo decoding operations to generate the data payload (e.g., data packet 503).

For instance, when transmitting the data packet 303 as shown and described in FIG. 3, the controller 204 may be configured to utilize the selected code rate 307 utilized in step 304 in order to perform the one or more decoding operations in step 520. In this example, the selected code rate 507 used in data payload reception (e.g., method 500) may be the same as selected code rate 307 used during data payload transmission (e.g., method 300). Similarly, the data packet 503 received in method 500 may be the same as data packet 303 transmitted in method 300.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A communication node of a multi-node communication network, the communication node comprising:
    a communication interface; and
    a controller communicatively coupled to the communication interface, the controller configured to:
        acquire a data payload to be transmitted based on a randomized transmission interval;
        duplicate a bit sequence of the data payload with a selected spreading pattern;
        perform bit-to-symbol mapping of the bit sequence based on a selected M-ary number to generate a data payload symbol sequence;
        randomize at least one of a location or value of one or more pilot symbols and one or more data carriers within one or more subcarriers of the data payload symbol sequence;
        transform frequency-domain symbols of the data payload symbol sequence into time-domain symbols to generate a time-domain data payload signal;
        remove amplitude fluctuation of the data payload signal to generate a phasor data payload signal; and
        transmit the phasor data payload signal, via the communication interface, to at least one additional communication node of the multi-node communication network.

2. The communication node of claim 1, wherein the controller is further configured to:
    filter the phasor data payload signal to a selected peak-to-average-power ratio (PAPr) within a selected spectral mask.

3. The communication node of claim 1, wherein the controller is further configured to:
    encode the bit sequence of the data payload with a forward error-correction code.

4. The communication node of claim 3, wherein a code rate of the forward error-correction code is selected based on at least one of a noise value or interference value determined by the communication node.

5. The communication node of claim 1, wherein the controller is further configured to:
    prepend a preamble to the data payload symbol sequence.

6. The communication node of claim 1, wherein the data payload symbol sequence is devoid of cyclic prefixes.

7. The communication node of claim 1, wherein the controller is further configured to:
    interleave the bit sequence of the data payload with a known interleaving pattern.

8. The communication node of claim 1, wherein performing bit-to-symbol mapping comprises:
    transforming each bit of the bit sequence to a constellation point based on the selected M-ary number.

9. The communication node of claim 1, wherein transforming frequency-domain symbols of the data payload symbol sequence into time-domain symbols to generate a time-domain data payload signal comprises:
    performing a serial-to-parallel conversion of the data payload symbol sequence in frequency-domain;
    transforming the data payload symbol sequence in frequency-domain to a data payload symbol sequence in time-domain with an inverse fast Fourier transform (IFFT); and
    performing a parallel-to-serial conversion of the data payload symbol sequence in time-domain to generate the time-domain data payload signal.

10. The communication node of claim 1, wherein acquiring a data payload to be transmitted comprises:
    acquiring the data payload from a data buffer stored in a memory of the communication node.

11. The communication node of claim 1, wherein the controller is further configured to remove amplitude fluctuation of the data payload signal to generate a phasor data payload signal with a selected peak-to-average-power ratio (PAPr).

12. A communication node of a multi-node communication network, the communication node comprising:
    a communication interface; and
    a controller communicatively coupled to the communication interface, the controller configured to:
        receive a data payload signal from an additional communication node of the multi-node communication network;
        estimate at least one of a time offset or a frequency offset based on a preamble of the data payload signal;
        performing one or more coarse timing synchronization processes on the data payload signal;
        transform the data payload signal from time-domain to frequency domain to generate a frequency-domain data payload symbol sequence;
        remove a randomization applied to at least one of one or more pilot symbols or one or more user data symbols of the data payload symbol sequence;
        correct one or more errors of the data payload symbol sequence using known pilot symbols within one or more subcarriers of the data payload symbol sequence;
        performing one or more dispreading operations based on a selected spreading pattern;
        demodulate the data payload symbol sequence based on a selected M-ary number to generate a bit sequence of the data payload symbol sequence; and
        perform one or more decoding operations on the bit sequence of the data payload to determine a data payload associated with the data payload signal.

13. The communication node of claim 12, wherein demodulating the data payload symbol sequence based on the selected M-ary number comprises:
    performing one or more soft-decision decoding operations on the data payload symbol sequence to generate a soft-decision symbol vector.

14. The communication node of claim 13, wherein the controller is further configured to:
    convert the soft-decision symbol vector into the bit sequence of the data payload the symbol sequence using the selected spreading pattern.

15. The communication node of claim 12, wherein performing one or more coarse timing synchronization processes on the data payload signal comprises:
    applying a numerically controlled oscillator (NCO) to the data payload signal.

* * * * *